US009563293B2

(12) United States Patent
Ulichney et al.

(10) Patent No.: US 9,563,293 B2
(45) Date of Patent: Feb. 7, 2017

(54) REMOTE-CONTROLLED POINTING

(75) Inventors: Robert Alan Ulichney, Marlborough, MA (US); Matthew D. Gaubatz, Ithaca, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1724 days.

(21) Appl. No.: 12/936,899

(22) PCT Filed: Apr. 9, 2008

(86) PCT No.: PCT/US2008/004668
§ 371 (c)(1),
(2), (4) Date: Oct. 7, 2010

(87) PCT Pub. No.: WO2009/126125
PCT Pub. Date: Oct. 15, 2009

(65) Prior Publication Data
US 2011/0032354 A1  Feb. 10, 2011

(51) Int. Cl.
*H04N 7/18*  (2006.01)
*G06F 3/038*  (2013.01)
(52) U.S. Cl.
CPC .................................. *G06F 3/0386* (2013.01)
(58) Field of Classification Search
None
See application file for complete search history.

(56) References Cited

U.S. PATENT DOCUMENTS

| 7,268,802 | B2 | 9/2007 | Stavely et al. |
| 8,203,603 | B2 * | 6/2012 | Harbert et al. ................. 348/91 |
| 2002/0054019 | A1 * | 5/2002 | Rosenberg et al. ........... 345/157 |
| 2007/0154086 | A1 * | 7/2007 | Cho et al. ..................... 382/162 |
| 2009/0115971 | A1 * | 5/2009 | Shan et al. ...................... 353/42 |

FOREIGN PATENT DOCUMENTS

| JP | 2003037840 | 7/2003 |
| JP | 2004128916 | 4/2004 |
| JP | 2007248710 | 9/2007 |

OTHER PUBLICATIONS

Dai et al., "Adaptive two-point stepsize gradient algorithm", Oct. 24, 2001, Klower Academic Publishers, Numerical Algorithms 27: 377-385, 2001.*

* cited by examiner

*Primary Examiner* — James M Anderson, II
(74) *Attorney, Agent, or Firm* — HP Inc. Patent Department

(57) ABSTRACT

A remote-controlled pointing system (32) includes a projector (36), an image sensor (34), and a controller (38). The projector (36) projects a beam (45) of light from a location in a projection plane (46) onto a scene (18). The image sensor (34) captures an image (54) of the scene (18) in a capture plane (50). The controller (38) performs operations that include transmitting the captured image (54) to a remote destination (14), receiving from the remote destination (14) a target beam location (44) in the capture plane (50), determining a location of the beam (45) in the capture plane (50), and changing the location in the projection plane (46) from which the beam (45) is projected based on the determined beam location and the target beam location (44).

22 Claims, 10 Drawing Sheets

REMOTE-CONTROLLED POINTING

BACKGROUND

Light beam pointers (e.g., laser pointers) are used in a variety of different applications (e.g., slide presentations and educational and user-assistance applications) to highlight or direct a viewer's attention to specific parts of a scene. A number of remote-controlled pointer systems have been proposed. In one such system, the position of a laser pointer spot on a viewgraph being presented on a display screen at a remote location is determined. The position of the laser spot is transmitted from the remote location to a receiving location. At the receiving location, a microcomputer adjusts a laser pointer to point to the same location on an identical viewgraph being presented on a display screen. In another proposed remote-controlled pointer system, a user moves a computer mouse within a set area (or control grid) of a computer monitor, the coordinates of the computer mouse within the set area are transmitted to a remote operator site, which includes a computer that controls the projection direction of a laser pointer at the remote operator site based on the received computer mouse coordinates. In another remote-controlled pointer system, images of an object are compared to stored images of objects, and information associated with a matching one of the stored images is used to control how a light beam is directed at the object being imaged.

SUMMARY

In one aspect, the invention features apparatus that includes a projector, an image sensor, and a controller. The projector projects a beam of light from a location in a projection plane onto a scene. The image sensor captures an image of the scene in a capture plane. The controller performs operations that include transmitting the captured image to a remote destination, receiving from the remote destination a target beam location in the capture plane, determining a location of the beam in the capture plane, and changing the location in the projection plane from which the beam is projected based on the determined beam location and the target beam location.

In one aspect, the invention features a method in accordance with which a beam of light is projected from a location in a projection plane onto a scene. An image of the scene is captured in a capture plane. The captured image is transmitted to a remote destination. A target beam location in the capture plane is received from the remote destination. A location of the beam in the capture plane is determined. The location in the projection plane from which the beam is projected is changed based on the determined beam location and the target beam location.

The invention also features a computer-readable medium storing computer-readable instructions causing a computer to implement the method described above.

Other features and advantages of the invention will become apparent from the following description, including the drawings and the claims.

DETAILED DESCRIPTION

Figure 1:
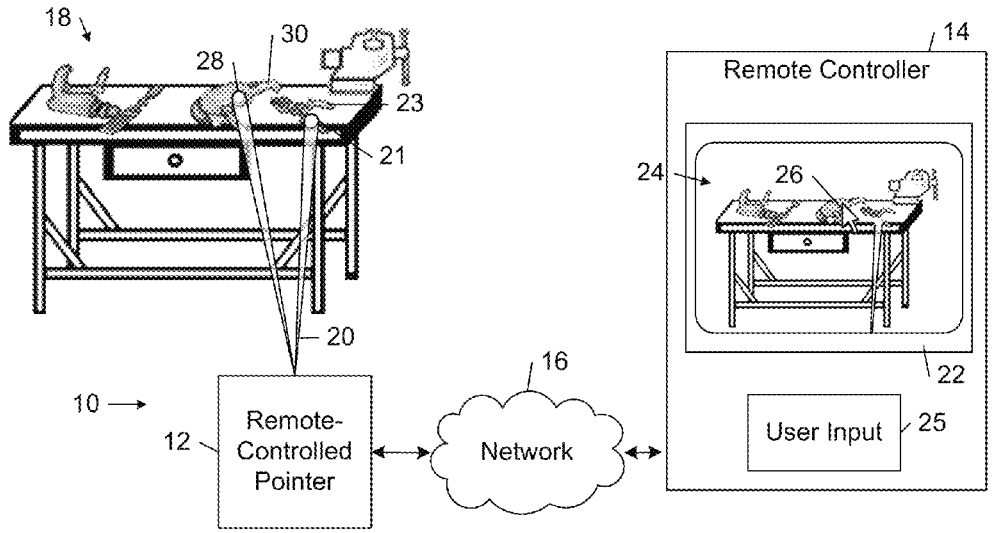
FIG. 1 is a diagrammatic view of an embodiment of a pointing system that includes a remote-controlled pointer and a remote controller.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail herein are capable of providing remote-controlled pointing in a way that does not require scene-dependent calibration using, for example, reference patterns (e.g., projected structured light patterns). Due to their efficient use of processing and memory resources, some of these embodiments may be implemented with relatively small and inexpensive components that have modest processing power and modest memory capacity. As a result, these embodiments are highly suitable for incorporation in compact device environments that have significant size, processing, and memory constraints, including but not limited to handheld electronic devices (e.g., a mobile telephone, a cordless telephone, a micro-projector, a personal digital assistant (PDA), a multimedia player, a game controller, a pager, a still image camera, and a video camera), portable computers, and other embedded data processing environments.

II. Definitons of Terms

The terms "beam of light" and "light beam" are used synonymously herein to mean a ray or shaft of light.

The term "spot" refers to either (i) an area of an object or other element in a scene that is illuminated by a beam of light or (ii) an area in the capture plane of an image sensor that is illuminated by light reflected from the illuminated area, without regard to its shape or size.

The term "image forming element" refers to an addressable region of an image. In some embodiments, the image forming elements correspond to pixels, which are the smallest addressable units of an image. Each image forming element has at least one respective value that is represented by one or more bits. For example, an image forming element in the RGB color space includes a respective value for each of the colors red, green, and blue, where each of the values may be represented by one or more bits.

A "computer" is a machine that processes data according to machine-readable instructions (e.g., software) that are stored on a machine-readable medium either temporarily or permanently. A set of such instructions that performs a particular task is referred to as a program or software program.

The term "machine-readable medium" refers to any medium capable carrying information that is readable by a machine (e.g., a computer). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

A "node" is a junction or connection point in a network. Exemplary nodes include, but are not limited to, a computer and a network switch.

III. Overview of an embodiment of a pointing system

FIG. 1 shows an embodiment of a pointing system 10 that includes a remote-controlled pointer 12 and a remote controller 14 that communicate with each other over a network 16 (e.g., the internet). The remote-controlled pointer 12 includes an image sensor for capturing images of a scene 18 and a projector for projecting a beam of light 20 onto a spot (e.g., the illuminated spot 21 on the object 23) in the scene 18. The remote controller 14 includes a display 22 for presenting images of the scene 18 that are captured by the remote-controlled pointer 12. The remote controller 14 also provides a user interface 24 and a user input 25 that allow a user to specify a target locations in the images presented on the display 22 (e.g., using a cursor, such as a virtual pointer 26).

In operation, the remote-controlled pointer 12 captures images of a scene 18 and transmits the captured images to the remote controller 14. The remote controller 14 transmits the coordinates of a user-specified target location (e.g., the location indicated by the virtual pointer 26) to the remote-controlled pointer 12. The remote-controlled pointer 12 converts the received target location coordinates into new projection coordinates in the coordinate system of the projector and projects the light beam 20 from the newly determined projection coordinates to a new location (e.g., the illuminated spot 28 on the object 30). The scene 18 typically contains one or more three-dimensional objects or elements that are illuminated and imaged by the remote-controlled pointer 12. In some implementations, however, the scene 18 contains a planar surface that is illuminated and imaged by the remote-controlled pointer 12.

The remote-controlled pointer 12 may be incorporated in a wide variety of device environments, including those that have significant size, processing, and memory constraints. For example, in some embodiments, the remote-controlled pointer 12 is implemented by any type of device that can be readily carried by a person, including mobile telephones, cordless telephones, micro-projectors, PDAs, multimedia players, game controllers, pagers, still image cameras, video cameras, portable (e.g., laptop and notebook) computers, and other embedded data processing devices.

The remote controller 14 also may be incorporated in a wide variety of device environments, including but not limited to computers (e.g., desktop, laptop, and notebook computers), handheld electronic devices, and other data processing environments. In some embodiments, the user input 25 and the display 22 are integrated into a single unitary device, such as a portable (e.g., handheld) electronic device. In other embodiments, the user input 25 and the display 22 are implemented as separate discrete devices, such as a separate pointing device and a separate display-based system. In general, the display-based system may be any type of display-based appliance that receives user input, including a general-purpose computer system, a special-purpose computer system, and a video game system. The display control signals may be transmitted to the display-based system over a wired communication link (e.g., a serial communication link, such as an RS-232 serial port, a universal serial bus, or a PS/2 port) or a wireless communication link (e.g., an infrared (IR) wireless link or a radio frequency (RF) wireless link). The user interface 24 provided by the remote controller 14 typically is generated by a local software application running on the remote controller 14. In some embodiments, the user interface 24 is generated by a web browser 18 that runs on the remote controller 14 and accesses data (e.g., images captured by the remote-controlled pointer 12 and user interface specifications) from an intermediate network node, which communicates with the remote-controlled pointer 12 and the remote controller 14.

The network 16 typically includes a number of different computing platforms and transport facilities, including a voice network, a wireless network, and a computer network (e.g., the internet), that support a variety of different media formats (e.g., internet and wireless formats). In this way, the network 16 enables users to remotely control the remote-controlled pointer 12 using a wide variety of different implementations of the remote controller 14, such as a personal computer and a wireless device (e.g., a wireless PDA and cellular telephone).

IV. Exemplary embodiments of the remote-controlled pointer

A. Overview

Figure 2:
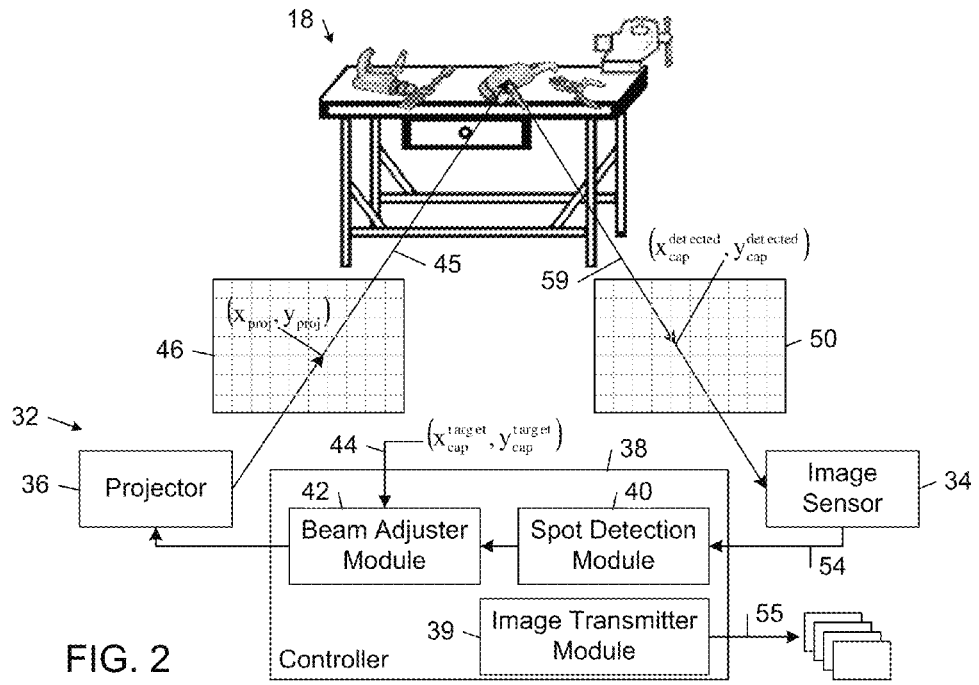
FIG. 2 is a block diagram of an embodiment of the remote-controlled pointer shown in FIG. 1.

FIG. 2 shows an embodiment 32 of the remote-controlled pointer 12 (see FIG. 1) that includes an image sensor 34, a projector 36, and a controller 38. The controller 38 includes an image transmitter module 39, a spot detection module 40, and a beam adjuster module 42. The image transmitter module 39 typically compresses data that are captured by the image sensor 34 and transmits the compressed images or video to the remote controller 14 over the network 16. The spot detection module 40 determines the locations of the light beams in the images that are captured by the image sensor 34. The beam adjuster module 42 changes the projection direction of the beam in response to receipt of the specified target location 44 from the remote controller 14.

The image sensor 34 may be implemented by any type of imaging device that is capable of capturing one-dimensional or two-dimensional images of a scene. The image sensor 34 typically includes at least one image sensing component with a respective light sensing active area. Exemplary image sensing components include charge coupled devices (CCDs) and complementary metal-oxide-semiconductor (CMOS)

devices. The image sensor 34 may include one or more optical elements for directing (e.g., shaping, focusing, or changing the propagation path of) the incoming light from the scene 18.

The projector 36 may be implemented by any type of light emitting device that is capable or projecting a beam of light in different directions so as to be able to illuminate different parts of the scene 18. Exemplary light sources include strongly colored incandescent light projectors with vertical slit filters, laser beam apparatus with spinning mirrors or holograms, and computer-controlled light projectors (e.g., LCD-based projectors or DLP-based projectors). The light beam typically is projected so as to illuminate objects within a specified illumination distance from the remote-controlled 12 pointer 32 with a beam spot that is large enough to be visible by an observer within a specified viewing distance of the object. The field of projection of the projector 36 typically is smaller than the field of view of the image sensor 34. The projected light beam may be a diverging beam or a collimated beam. The axially transverse cross-section of the projected light beam may have any of a wide variety of different shapes, including but not limited to circular, elliptical, oval, and rectangular.

The controller 38 may be implemented by one or more discrete modules (or data processing components) that are not limited to any particular hardware, firmware, or software configuration. The modularization of the embodiments of the controller 38 ensures that, as improvements are made to its respective functions, updates can be applied without adversely affecting performance. In the illustrated embodiment, the image transmitter module 39, the spot detection module 40, and the beam adjuster module 42 may be implemented in any computing or data processing environment, including in digital electronic circuitry (e.g., an application-specific integrated circuit, such as a digital signal processor (DSP)) or in computer hardware, firmware, device drivers, or software. In some embodiments, the functionalities of multiple ones of the modules 39, 40, and 42 are combined into a single processing component. In some embodiments, the respective functionalities of each of one or more of the modules 39, 40, and 42 are performed by a respective set of multiple processing components. In some embodiments, computer process instructions for implementing the methods that are executed by the controller 38, as well as the data it generates, are stored in one or more machine-readable media. In other embodiments, the spot detection module 40 and the beam adjuster module 42 may be implemented on remote environments, such as other computers in a network.

Figure 3:
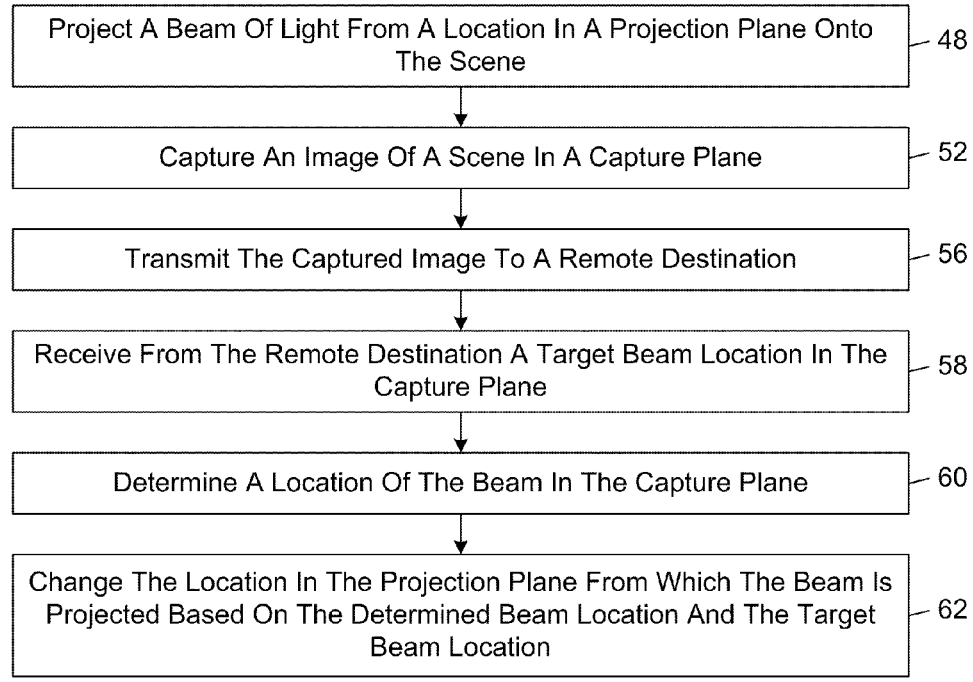
FIG. 3 is a flow diagram of an embodiment of a remote-controlled pointing method.

FIG. 3 shows an embodiment of a method that is implemented by the controller 38. In accordance with this method, under the control of the beam adjuster module 42, the projector 36 projects a beam 45 of light from a location $(x_{proj}, y_{proj})$ in a projection plane 46 onto the scene 18 (FIG. 3, block 48). The image sensor 34 captures an image of the scene 18 in a capture plane 50 (FIG. 3, block 52). The image transmitter module 39 compresses the captured image 54 and transmits the compressed image 55 to the remote controller 14, which typically is located at a remote controller 14 (FIG. 3, block 56). The controller 38 receives from the remote destination a target beam location $(x_{cap}^{target}, y_{cap}^{target})$ in the capture plane 50 (FIG. 3, block 58). The spot detection module 40 determines a location $(x_{cap}^{detected}, y_{cap}^{detected})$ of the reflected portion 59 of the beam 45 in the capture plane 50 (FIG. 3, block 60). The beam adjuster module 42 changes the location in the projection plane from which the beam 45 is projected based on the determined beam location $(x_{cap}^{detected}, y_{cap}^{detected})$ and the target beam location $(x_{cap}^{target}, y_{cap}^{target})$ (FIG. 3, block 62). The processes described in blocks 56-62 may occur in the order shown in FIG. 3 or in a different order.

The following sections describe embodiments of processes that are performed by the spot detection module 40 and the beam adjuster module 42.

B. Determining a Location of the Light Beam in the Capture Plane

The spot detection module 40 may determine a location $(x_{cap}^{detected}, y_{cap}^{detected})$ of the reflected portion 59 of the beam 45 in the capture plane 50 (FIG. 3, block 60) in a variety of different ways.

In some embodiments, the spot detection module 40 performs real-time image forming element thresholding by determining whether the color of each image forming element in the captured images is greater than a predefined, empirically-determined threshold value. In some of these embodiments, the projector 36 projects a white light beam onto the scene 18 and the image forming element values that are used for thresholding correspond to mappings of the image forming element color values to corresponding grayscale values. Two examples of such grayscale mappings $(G_1^n(x,y)$ and $G_2^n(x,y))$ are given by equations (1) and (2):

$$G_1^n(x,y) = r^n(x,y) + g^n(x,y) + b^n(x,y) \tag{1}$$

$$G_2^n(x,y) = 0.299 \times r^n(x,y) + 0.587 \times g^n(x,y) + 0.114 \times b^n(x,y) \tag{2}$$

where $r^n$, $g^n$ and $b^n$ are red, green, and blue color component values for each image forming element (x,y) of the nth image. In the first grayscale mapping (equation (1)), the image forming element intensities are represented by an un-weighted sum of the red, green, and blue color component values, whereas in the second grayscale mapping (equation (2)), the image forming element intensities are represented by a weighted sum of the red, green, and blue color component values that corresponds to the luminance values of the image forming elements. In other embodiments, the image forming element intensities may correspond to the values of a single color (e.g., green color values in a red-green-blue color representation of the image forming elements) or a function (e.g., the $l_2$ norm) that is computed based on image forming element color. For each of the captured images, the spot detection module 40 averages the locations (i.e., coordinates) of image forming elements with grayscale values above the threshold value to identify the centroid location of the light beam in each of the captured images. The centroid location is used to represent the location of the light beam in each image. In some implementations, one or more noise reduction filters are applied to the coordinate data before the centroid coordinates are computed.

Figure 4:
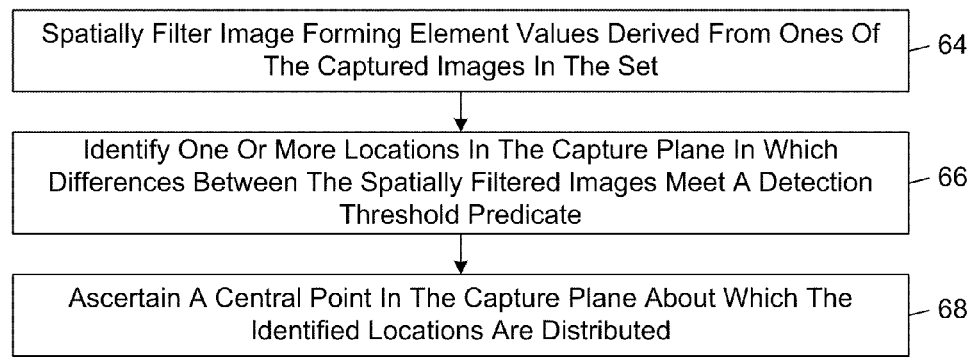
FIG. 4 is a flow diagram of an embodiment of a method of determining a location of a light beam in a capture plane.

In some embodiments, the controller 38 directs the projector 36 to intermittently project the beam 45 onto the scene 18, and the spot detection module 40 determines the location of the beam in the capture plane 50 based on an analysis of a set of images of the scene that are captured by the image sensor 34. FIG. 4 shows an embodiment of a method by which the spot detection module 40 analyzes the set of captured images.

In accordance with the method of FIG. 4, the spot detection module 40 spatially filters image forming element values that are derived from ones of the captured images in the set (FIG. 4, block 64). In some embodiments, the spot detection module 40 performs a spatial smoothing operation on a respective intensity image of each image that is derived in accordance with one of the grayscale mappings described above. In some of these embodiments, the spatial smoothing operation is performed with a linear kernel $h_{spatial}(x,y)$ as follows:

$$G_{i,spatial}^n(x,y) = h_{spatial}(x,y) \otimes G_i^n(x,y) \quad (3)$$

where $G_{i,spatial}^n(x,y)$ is the spatially smoothed value for image forming element (x,y) in the intensity image $G_i^n(x,y)$, and $i \in \{1,2\}$.

Once the intensity images are smoothed (FIG. 4, block 64), the spot detection module 40 identifies one or more locations in the capture plane in which differences between the spatially filtered images meet a detection threshold predicate (FIG. 4, block 66). In some embodiments, the following thresholding operation is performed to reveal image forming elements that have changed over the last two frames:

$$D^n(x,y) = \begin{cases} 1 & \text{if } |G_{i,spatial}^n(x,y) - G_{i,spatial}^{n-1}(x,y)| > K \\ 0 & \text{otherwise} \end{cases} \quad (4)$$

where K is an empirically determined constant value.

Next, the spot detection module 40 ascertains a central point in the capture plane about which the identified locations are distributed (FIG. 4, block 68). In some embodiments, the central point corresponds to the centroid of $D^n(x,y)$, which is denoted $(x_{cent}[n], y_{cent}[n])$ and is computed in accordance with equations (5) and (6):

$$x_{cent}[n] = \sum_{x,y} \{x \cdot D^n(x,y)\} \quad (5)$$

$$y_{cent}[n] = \sum_{x,y} \{y \cdot D^n(x,y)\} \quad (6)$$

The location $(x_{cap}^{detected}, y_{cap}^{detected})$ of the reflected portion 59 of the beam 45 in the capture plane 50 is then given by equations (7) and (8):

$$x_{cap}^{detected} = h_{temp}[n] \otimes x_{cent}[n] \quad (7)$$

$$y_{cap}^{detected} = h_{temp}[n] \otimes y_{cent}[n] \quad (8)$$

where $h_{temp}[p]$ is a linear temporal smoothing filter kernel. This filtering helps reduce jitter in the behavior of the beam-adjuster. If $h_{temp}[n]$ has extended temporal support, the beam adjuster will move more smoothly, but more slowly as well.

Figure 5:
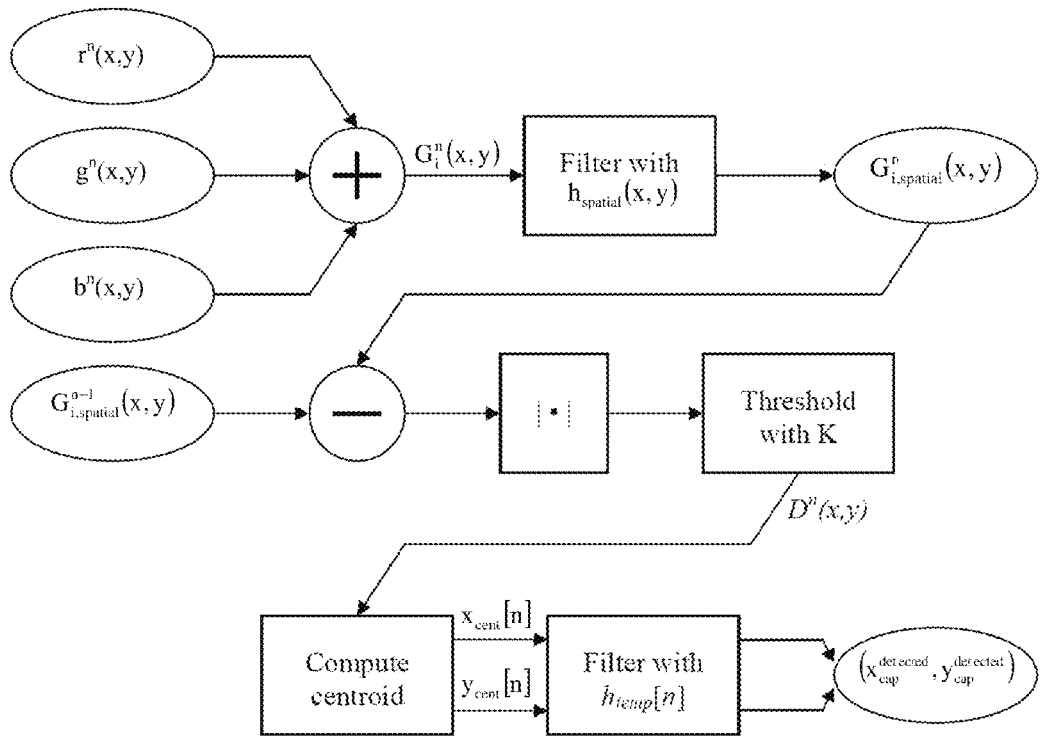
FIG. 5 shows a diagram of information flow in accordance with the method of FIG. 4.

FIG. 5 shows a diagram of information flow in accordance with the method of FIG. 4.

C. Changing the Location in the Projection Plane from which the Light Beam is Projected The beam adjuster module 42 may change the location in the projection plane from which the beam 45 is projected based on the determined beam location $(x_{cap}^{detected}, y_{cap}^{detected})$ and the target beam location $(x_{cap}^{target}, y_{cap}^{target})$ (FIG. 3, block 62) in a variety of different ways.

The beam adjuster module 42 typically is designed to change the projection point $(x_{proj}, y_{proj})$ of the beam such that the determined beam location $(x_{cap}^{detected}, y_{cap}^{detected})$ coincides with the target beam location $(x_{cap}^{target}, y_{cap}^{target})$. In this regard, the determined beam location depends on projection point of the beam. That is, $$x_{cap}^{detected} = f(x_{proj}, y_{proj}) \quad (9)$$

$$y_{cap}^{detected} = g(x_{proj}, y_{proj}) \quad (10)$$

where $f(\bullet)$ and $g(\bullet)$ are functions that map $x_{proj}$ and $y_{proj}$ to $x_{cap}^{detected}$ and $y_{cap}^{detected}$, respectively.

In some embodiments, the beam adjuster module 42 determines the projection point $(x_{proj}, y_{proj})$ by solving equations (11) and (12) below:

$$f(x_{proj}, y_{proj}) - x_{cap}^{target} = 0 \quad (11)$$

$$g(x_{proj}, y_{proj}) - y_{cap}^{target} = 0 \quad (12)$$

Figure 6:
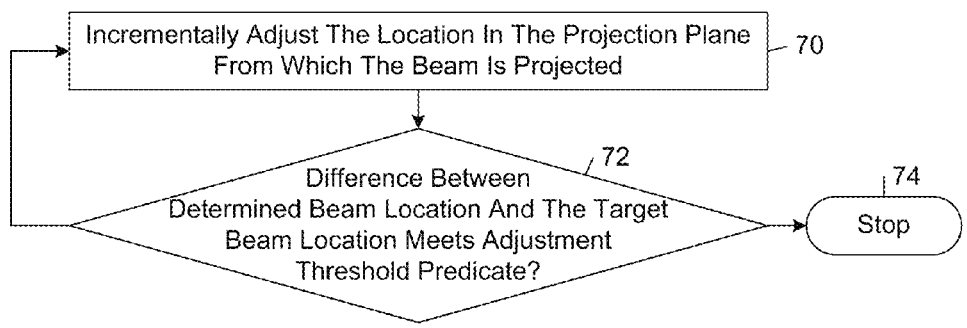
FIG. 6 is a flow diagram of an embodiment of a method of changing the location in a projection plane from which a light beam is projected.

FIG. 6 shows an embodiment of another method for solving equations (11) and (12). In accordance with this method, the beam adjuster module 42 incrementally adjusts the location $(x_{proj}, y_{proj})$ in the projection plane from which the beam is projected (FIG. 6, block 70). If the difference between the determined beam location $(x_{cap}^{detected}, y_{cap}^{detected})$ and the target beam location $(x_{cap}^{target}, y_{cap}^{target})$ meets an adjustment threshold predicate (FIG. 6, block 72), the process is terminated (FIG. 6, block 74); otherwise, the process is repeated (FIG. 6, block 70).

In some of these embodiments, equations (11) and (12) are solved using a root-finding process (e.g., Newton's method). Such a process, however, typically relies on the assumption that $f(\bullet)$ and $g(\bullet)$ satisfy regularity conditions, which is not always the case due to: (1) inaccuracies introduced by the spot detection module 40 (i.e., time-varying differences between the determined beam location $(x_{cap}^{detected}, y_{cap}^{etected})$ and the actual beam location); and (2) the three-dimensional geometry of a captured scene may results in discontinuities in $f(\bullet)$ and $g(\bullet)$, especially if there are any edges present.

In other embodiments, equations (11) and (12) are solved using a gradient-descent type of update for $x_{proj}$ and $y_{proj}$. In these embodiments, the beam adjuster module 42 calculates a new location $(x_{proj}(t+1), y_{proj}(t+1))$ in the projection plane from which to project the beam as follows $$x_{proj}(t+1) = x_{proj}(t) - \alpha \cdot (x_{cap}^{detected}(t) - x_{cap}^{target}(t)) \quad (13)$$

$$y_{proj}(t+1) = y_{proj}(t) - \alpha \cdot (y_{cap}^{detected}(t) - y_{cap}^{target}(t)) \quad (14)$$

where $(x_{proj}(t), y_{proj}(t))$ is the location in the projection plane from which the beam currently is being projected, $(x_{cap}^{detected}(t), y_{cap}^{detected}(t))$ is the determined beam location, $(x_{cap}^{target}(t), y_{cap}^{target}(t))$ is the current target beam location, and $\alpha$ is an adjustment factor. If $\alpha$ is too small, the algorithm typically will approach the desired solution, but slowly. If $\alpha$ is too large, the algorithm typically will converge more quickly, but will oscillate around the desired solution. In some embodiments, $\alpha$ is adjusted dynamically based on a heuristic such that it is inversely proportional to the distance between $(x_{cap}^{target}(t), y_{cap}^{target}(t))$ and $(x_{cap}^{detected}(t), y_{cap}^{detected}(t))$. In some of these embodiments, the adjustment factor $\alpha(t)$ is given by equation (15):

$$\alpha(t) = \frac{L}{\sqrt{(x_{proj}(t) - x_{cap}^{detected}(t))^2 + (y_{proj}(t) - y_{cap}^{detected}(t))^2}} \quad (15)$$

where L is a constant. In some embodiments, the value of $\alpha(t)$ is clipped to prevent erratic behavior. In some embodiments, the beam adjuster module 42 module 42 additionally is optimized for faster convergence, for example, by storing the relationships $f(x_{proj}, y_{proj})$ and $g(x_{proj}, y_{proj})$ in a lookup table.

Figure 7:
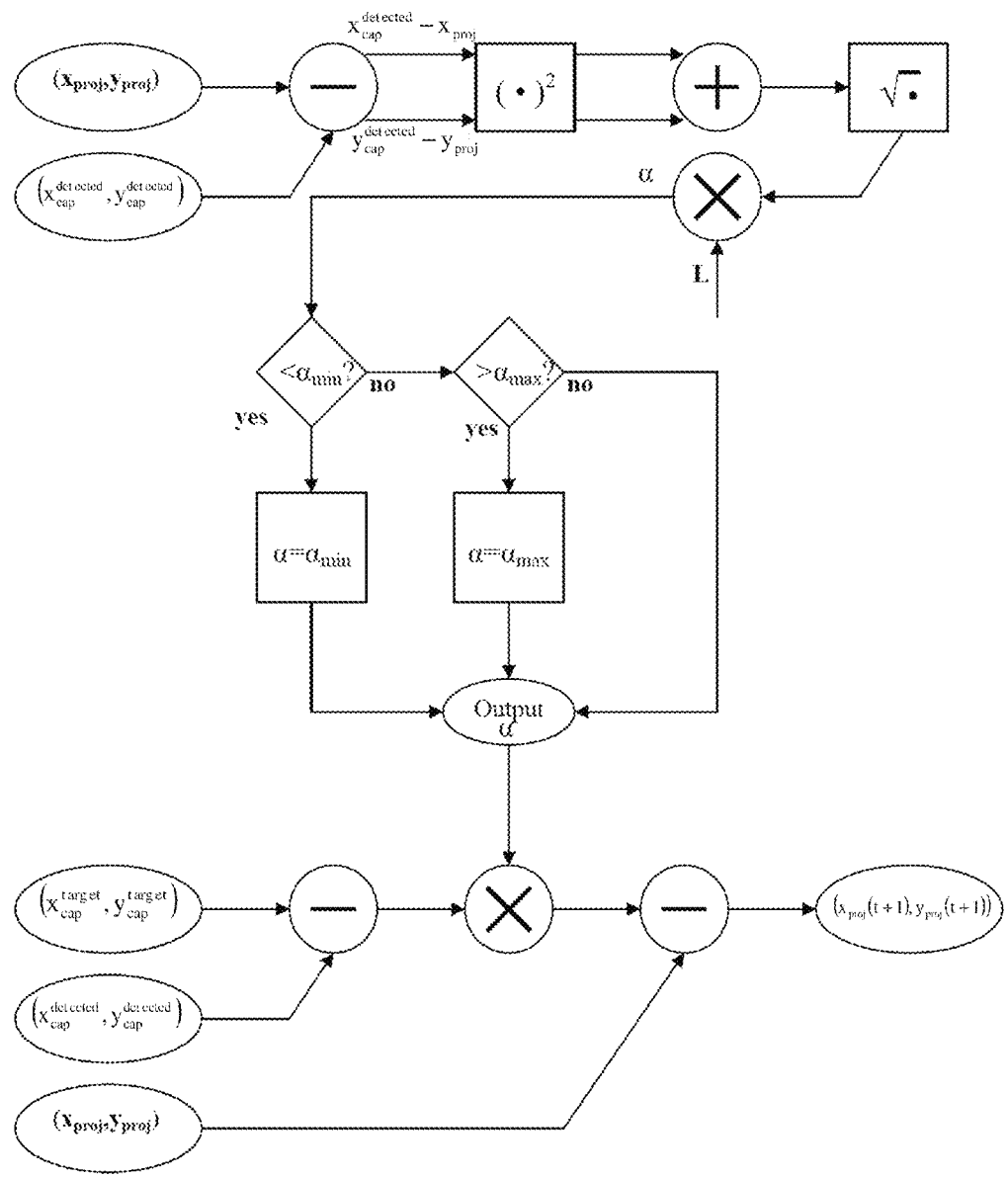
FIG. 7 shows a diagram of information flow in accordance with the method of FIG. 6.

FIG. 7 shows a diagram of information flow in accordance with the method of FIG. 6.

D. Forming the Projection Beam

In some embodiments, the projector 36 only projects a beam specifically at the projection location $(x_{proj}(t+1), y_{proj}(t+1))$. In other embodiments, the projector 36 projects a different color at every location (x,y) in the projection plane. In these embodiments, the controller 71 includes an additional beam formation module, which determines exactly what values will be projected at every location (x,y) in the projection plane.

Figure 8:
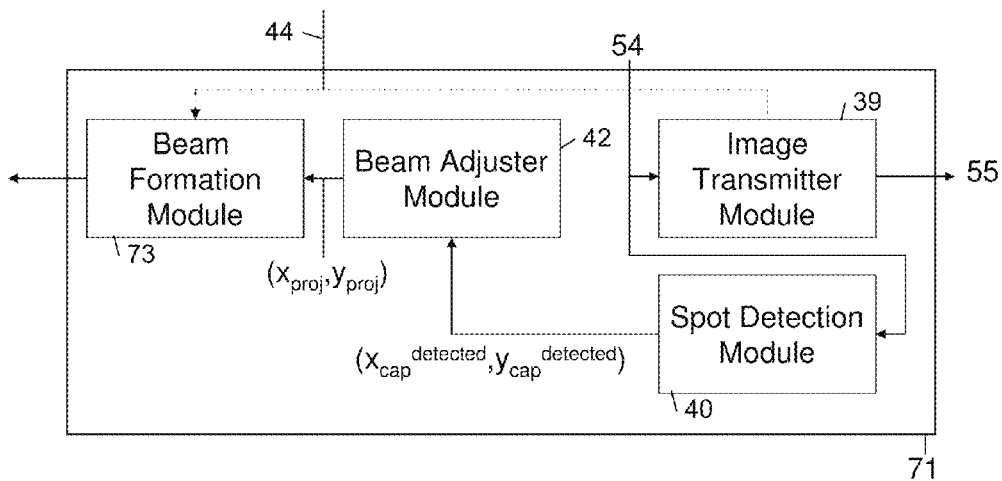
FIG. 8 is a block diagram of an embodiment of a controller of the pointing system shown in FIG. 1.
Figure 9A:
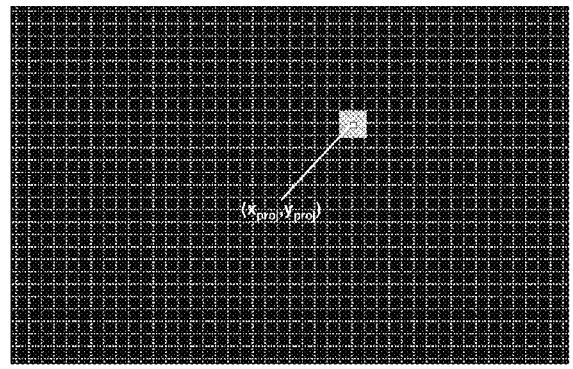
FIG. 9A shows a diagrammatic view of a projection plane in which light is projected from a neighborhood surrounding a target location.
Figure 9B:
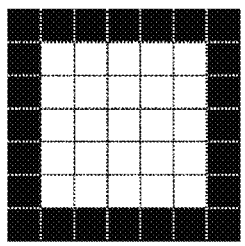
FIG. 9B shows a diagrammatic view of a portion of a projection plane from which a square-shaped beam is projected.
Figure 9C:
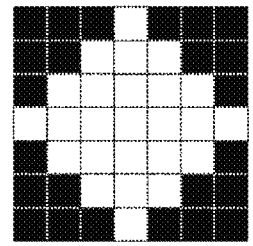
FIG. 9C shows a diagrammatic view of a portion of a projection plane from which a diamond-shaped beam is projected.

FIG. 8 shows an embodiment 71 of the controller 38 that includes a beam formation module 73 that determines the nature of the beam that is displayed by the projector 36. In some implementations, the beam formation module 73 directs the projector 36 to form the beam by projecting a bright color at all locations in a neighborhood of $(x_{proj}(t+1), y_{proj}(t+1))$, and projecting no color at all other locations. The shapes that denote the geometry of the neighborhood include but are not limited to squares, rectangles, circles, and ellipses. The size of the neighborhood may be determined conditions such as the lighting in the projection environment, the type of projector 36 in the system, or the type of image sensor 34 in the system. FIG. 9A shows a diagrammatic view of a projection plane in which light is projected from a 5×5 neighborhood surrounding the projection location $(x_{proj}, y_{proj})$. FIG. 9B shows a diagrammatic view of a portion of the projection plane from which a square-shaped beam is projected. FIG. 9C shows a diagrammatic view of a portion of the projection plane from which a diamond-shaped beam is projected.

Figure 10A:
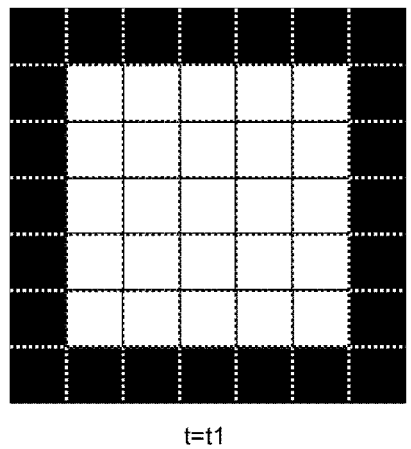
FIGS. 10A and 10B show different embodiments of beams projected from a projection plane at different times.
Figure 10A:
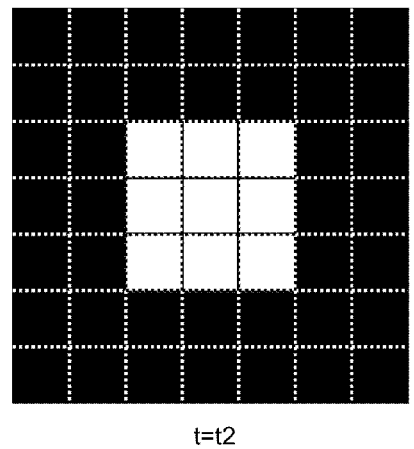
Figure 10B:
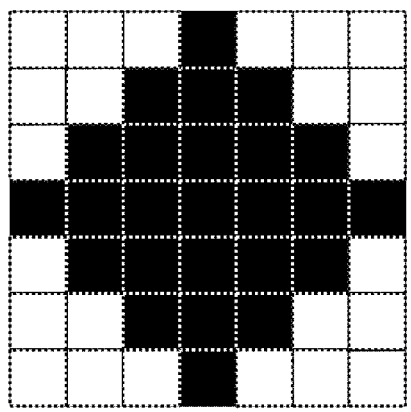
Figure 10B:
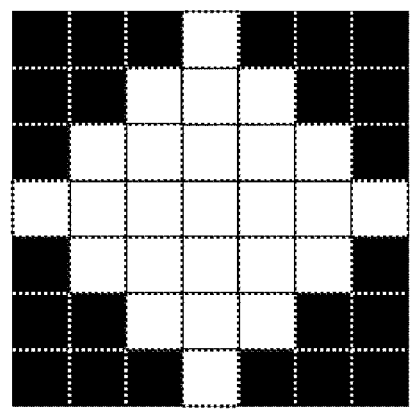

In some embodiments, the projected beam varies over time. The mode of variation includes, but is not limited to changing the color of the beam, changing the shape of the beam, changing the size of the beam, or even alternating between projecting a beam and projecting no signal (effectively disabling the projector). FIG. 10A shows an embodiment in which the size of the beam of FIG. 9B alternates between the size shown at time t1 and the size shown at time t2. FIG. 10B shows an embodiment in which the projector alternates between projecting the background region surrounding the beam of FIG. 9C as shown at time t1 and projecting the beam of FIG. 9C as shown at time t2. Using timing information from the image sensor, the beam formation module 73 can modify the beam to artificially introduce changes in the scene that occur so fast such that they are not plainly visible to a human observer. Such artificially fast changes can improve the performance of the spot detection module 40.

E. Exemplary Asynchronous Modular Embodiment of the Remote-Controlled Pointer

In some embodiments, the modules of the remote-controlled pointer 12 perform their respective functions asynchronously. For example, the functions of the modules of the remote-controlled pointer 38 (see FIG. 2) perform the transmitting process and the receiving process in a first process loop and perform the determining process and the changing process in a second process loop, as illustrated diagrammatically in FIG. 11. In this embodiment, after receiving a connection from the remote controller 14 (FIG. 11, block 76), image capture (FIG. 11, block 78), image compression and transmission (FIG. 11, block 80), reception of the target beam locations (FIG. 11, block 82), dot-detection (FIG. 1, block 84), and beam adjustment (FIG. 11, block 86) are performed as asynchronous events.

Figure 11:
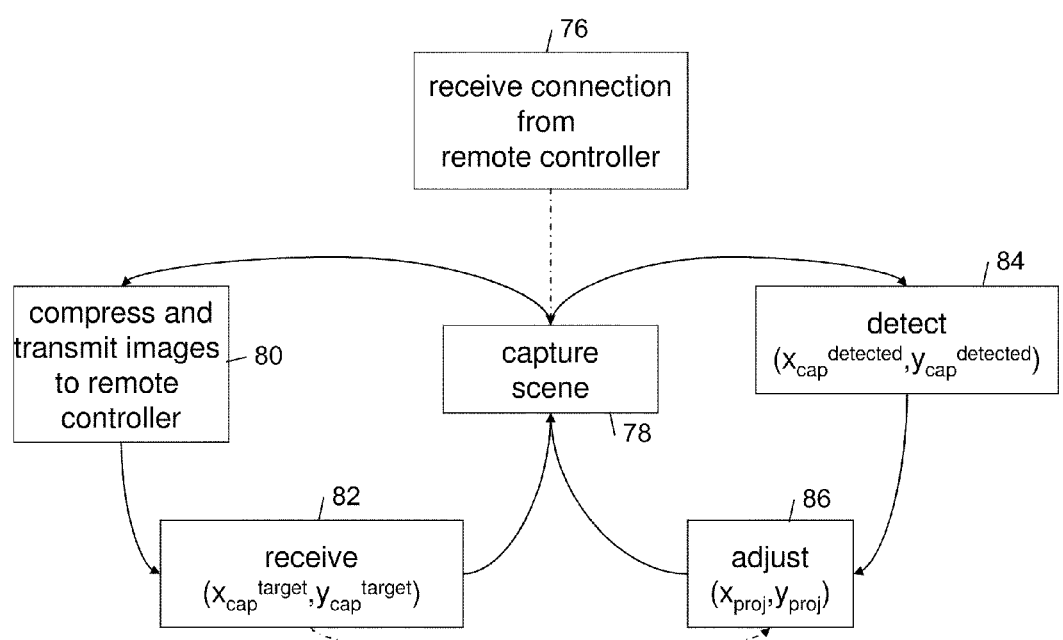
FIG. 11 is a flow diagram of an embodiment of a remote-controlled pointing method.

The asynchronous design of the embodiment shown in FIG. 11 benefits the performance of the remote-controlled pointer 12 in a number of ways. For example, this design: (1) prevents connectivity issues from interfering with the operation of the beam; and (2) assumes no temporal relationship between events in the image capture/beam adjustment. The first issue arises due to uncertainty with respect to the connection of the remote-controlled pointer 38 the remote controller 14. The asynchronous design attempts to compensate for lost data, uncertainties between when network data is written to output buffers and when it is actually transmitted, communication delays, heavy network traffic, etc. A side benefit of this design is that in the case when the spot detector 40 is implemented in the same system as the image sensor 34, as camera frame-capture rates increase, the speed of convergence of the beam adjustment process will continue to improve, regardless of the bandwidth available to transmit a captured scene. The second issue is important because, other than causality, no relationship can be inferred between (i) the time the projection coordinates are modified, (ii) the time the projector displays a modified beam, (iii) the time the image with the modified beam is captured by the image sensor 34, and (iv) the time the location of the modified beam is detected by the spot detection module 40. To ensure the remote-controlled pointer 38 is robust to variety in camera frame capture rate, available computational power and projector refresh rate, these assumptions are respected in the embodiment shown in FIG. 11.

F. Exemplary Hand-Held Embodiment of the Remote-Controlled Pointer

Figure 12A:
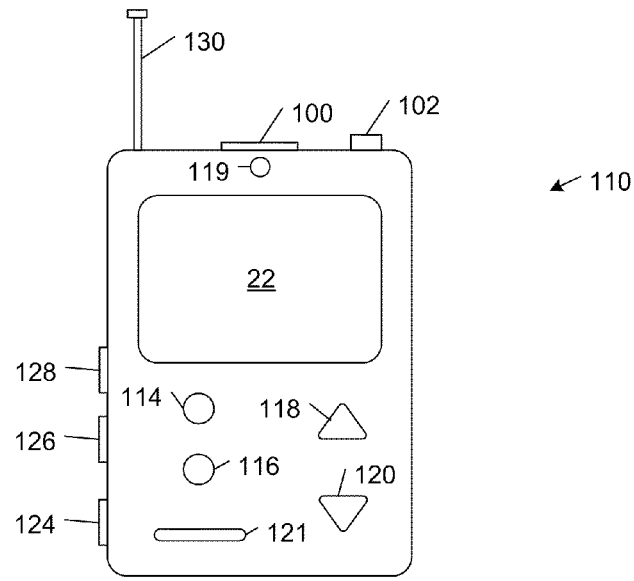
FIG. 12A is a diagrammatic front view of an embodiment of the remote-controlled pointer shown in FIG. 1.

Referring to FIG. 12A, in one embodiment, remote-controlled pointer 12 may be implemented as a handheld electronic device 110. The handheld electronic device 110 includes the display 22 that displays the user interface 24, which also may present one or more user options for controlling the operation of handheld electronic device 110. In addition, the handheld device 110 includes an image sensing port 100 through which the image sensor 34 captures images of the scene 18 and a projection port 102 through which the projector 26 projects the light beam 20 onto the scene 18. The handheld electronic device 110 also includes various user controls, including control buttons 114, 116, 118, 120, a speaker 119, and a microphone 121. The handheld electronic device 110 has an output port 124 for connecting to an input jack of an audio output device (e.g., headphones), and a cable port 126 for connecting to a computer or other hardware system. The handheld electronic device 110 further includes a wireless communication port 128, for example, an IrDA (Infrared Data Association) port, through which the handheld electronic device 110 may wirelessly communicate with other similarly configured devices. Some embodiments may include an RF antenna 130 instead of, or in addition to, wireless communication port 128.

Figure 12B:
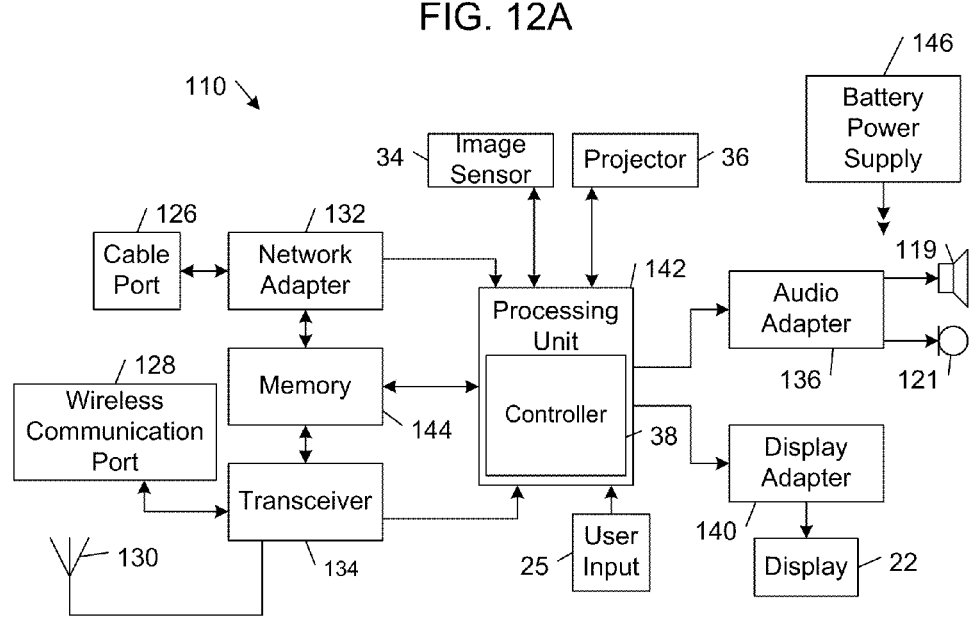
FIG. 12B is a block diagram of components of the remote-controlled pointer shown in FIG. 2A.

As shown in FIG. 12B, the handheld electronic device 110 has a communication subsystem that includes a network adapter 132 that is configured to communicate through the cable port 126 and a transceiver 134 that is configured to communicate through the wireless communication port 128 (or antenna 130). The handheld electronic device 110 also may have a digital content rendering subsystem that includes an audio adapter 136 and a display adapter 140. The audio adapter 136 is configured to transmit digital audio data signals to the speaker 119 and to process the signals received from the microphone 121. The display adapter 140 is configured to transmit image data signals to the display screen 22. A processing unit 142 is configured to choreograph the operation of the handheld electronic device 110. The handheld electronic device 110 also has a memory 144 that typically includes a random access memory (RAM) and a read only memory (ROM). In some embodiments, one or more other storage technologies may be used, including an internal hard drive and a removable storage device (e.g., a removable hard drive, storage card or disk). A battery power supply 146 supplies the electrical power needed to operate handheld electronic device 110.

G. Exemplary Distributed Embodiments of the Remote-Controlled Pointer

Figure 13:
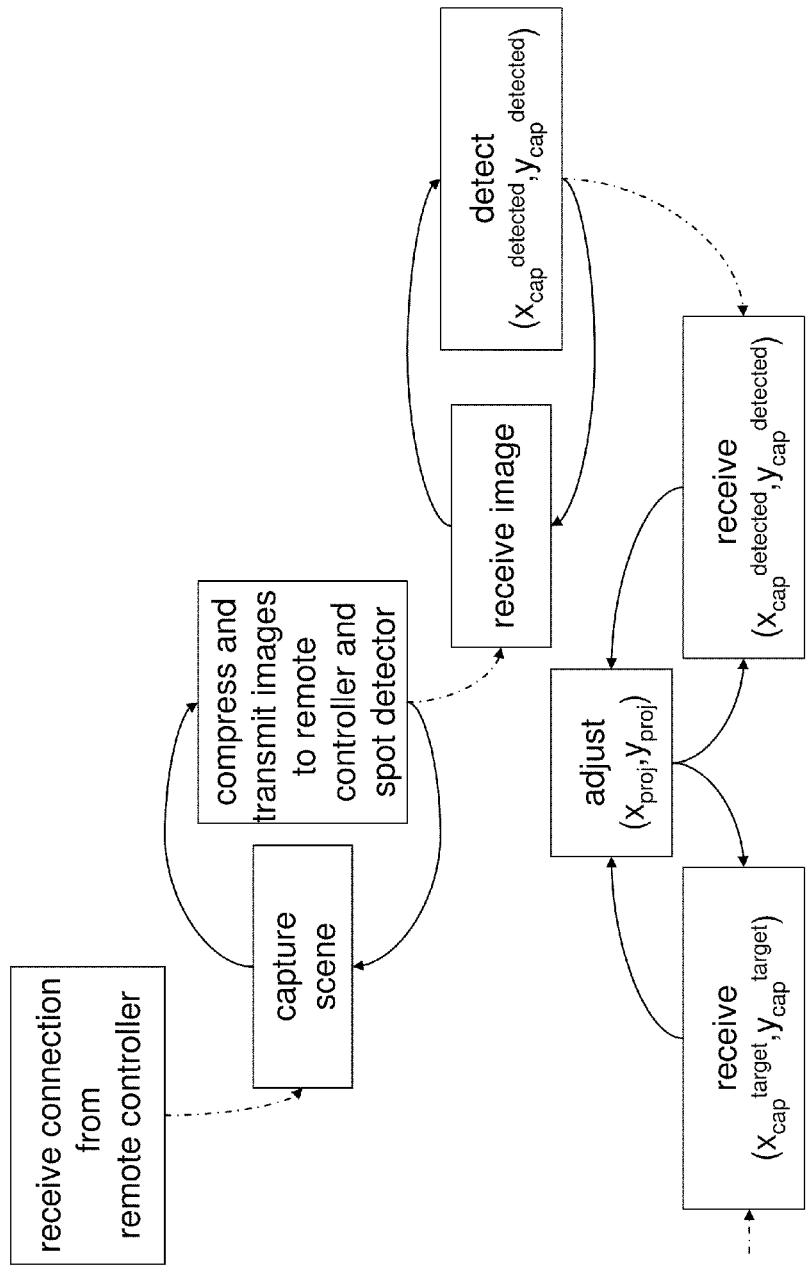
FIG. 13 is a flow diagram of an embodiment of a remote-controlled pointing method.

In some embodiments, one or more of the modules of the controller 38 are distributed across one or more other devices. For example, in some embodiments, each of the spot detection module 40, the beam adjuster module 42, and the image transmitter module 39 is located on a different respective device. In these embodiments, the modules 39, 40, and 42 may perform their respective functions asynchronously, as shown in FIG. 13.

Other variations are possible. For example, in some embodiments, the beam adjuster module 42 and the image transmitter module 39 are located on the same device, whereas the spot detection module 40 is located on a different device. In some embodiments, the spot detection module 40 and the image transmitter module 39 are located on the device, whereas the beam adjuster module 42 is located on a different device. In some embodiments, the spot detection module 40 and the beam adjuster module 42 are located on the same device, whereas the image transmitter module 39 is located on a different device. The event flows for these other variations correspond to respective combinations of elements of the undistributed embodiment shown in FIG. 11 and elements of the fully distributed embodiment shown in FIG. 13.

V. Exemplary Embodiments of the Remote Controller

The remote controller 14 (see FIG. 1) may be implemented by one or more discrete modules (or data processing components) that may be implemented in any computing or data processing environment, including in digital electronic circuitry (e.g., an application-specific integrated circuit, such as a digital signal processor (DSP)) or in computer hardware, firmware, device driver, or software. In some implementations, computer process instructions for implementing the methods that are executed by the remote controller 14, as well as the data it generates, are stored in one or more machine-readable media.

Figure 14:
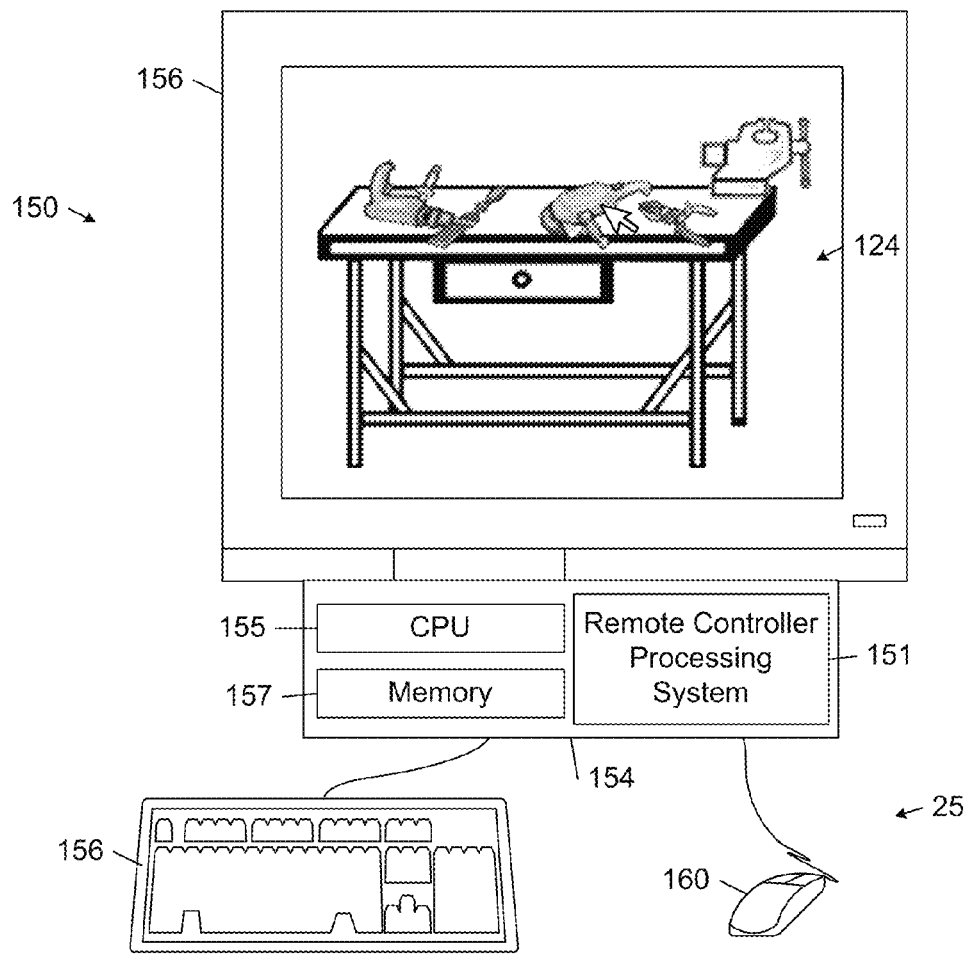
FIG. 14 is a diagrammatic view of an embodiment of the remote controller system shown in FIG. 1.

FIG. 14 shows an embodiment 150 of the remote controller 14 in which the remote control functions are performed by a remote controller processing system 151 that is incorporated in a computer system 154, and the display 22 is implemented by a computer display monitor 156 that is controlled by a display controller in the computer 154.

The computer system 154 includes a processing unit (CPU) 155, a system memory 157, and a system bus that couples the processing unit to the various components of the computer system. The processing unit 155 typically includes one or more processors, each of which may be in the form of any one of various commercially available processors. The system bus may be a memory bus, a peripheral bus or a local bus, and may be compatible with any of a variety of bus protocols, including PCI, VESA, Microchannel, ISA, and EISA. The computer system 154 also includes a persistent storage memory (e.g., a hard drive, a floppy drive, a CD ROM drive, magnetic tape drives, flash memory devices, and digital video disks) that is connected to the system bus and contains one or more computer-readable media disks that provide non-volatile or persistent storage for data, data structures and computer-executable instructions.

The system memory 157 typically includes a read only memory (ROM) that stores a basic input/output system (BIOS) that contains start-up routines for the computer system and a random access memory (RAM). The system memory 157 also stores an embodiment of the remote controller processing system 151, a GUI driver, input data, output data, intermediate processing data, and other data. A user may interact (e.g., enter commands or data) with the computer system 154 using one or more input devices 25 (e.g., a keyboard 158, a computer mouse 160, a microphone, joystick, and touch pad). The computer system 154 also typically includes peripheral output devices, such as speakers and a printer. The computer system 154 can connect to the remote-controlled pointer 12 through a network interface card (NIC). Information may be presented through the graphical user interface (GUI) 24 that is displayed to the user on the computer display monitor 156. The GUI 24 typically is integrated into the remote controller processing system. In some embodiments, the remote controller processing system 151 interfaces with the GUI driver and the user input 25 to control the remote-controlled pointer 12.

VI. Conclusion

The embodiments that are described in detail herein are capable of providing remote-controlled pointing in a way that does not require scene-dependent calibration using, for example, reference patterns (e.g., projected structured light patterns). Due to their efficient use of processing and memory resources, some of these embodiments may be implemented with relatively small and inexpensive components that have modest processing power and modest memory capacity. As a result, these embodiments are highly suitable for incorporation in compact device environments that have significant size, processing, and memory constraints.

Other embodiments are within the scope of the claims.

What is claimed is:

1. Apparatus, comprising:
a projector operable to project a beam of light from a location in a projection plane onto a scene;
an image sensor operable to capture an image of the scene in a capture plane;
a controller operable to perform operations comprising transmitting the captured image to a remote destination, receiving from the remote destination a target beam location in the capture plane, determining a location of the beam in the capture plane, and changing the location in the projection plane from which the beam is projected based on the determined beam location and the target beam location.

2. The apparatus of claim 1, wherein the controller additionally is operable to direct the projector to intermittently project the beam onto the scene, and in the determining the controller is operable to determine the location of the beam in the capture plane based on an analysis of a set of images of the scene captured by the image sensor.

3. The apparatus of claim 2, wherein in the determining of the location of the beam in the capture plane the controller performs operations comprising: spatially filtering the images in the set; identifying one or more locations in the capture plane in which differences between the spatially filtered images meet a detection threshold predicate; and ascertaining a central point in the capture plane about which the identified locations are distributed.

4. The apparatus of claim 3, wherein in the determining of the location of the beam in the capture plane the controller repeats the filtering, the identifying, and the ascertaining for one or more additional sets of images of the scene captured by the image sensor; and the controller determines the location of the beam in the capture plane based on a temporal filtering of the ascertained central points.

5. The apparatus of claim 1, wherein in the changing the controller changes the location in the projection plane from which the beam is projected in response to a difference between the determined beam location and the target beam location.

6. The apparatus of claim 1, wherein in the changing the controller performs operations comprising incrementally adjusting the location in the projection plane from which the beam is projected until a difference between the determined beam location and the target beam location meets an adjustment threshold predicate.

7. The apparatus of claim 6, wherein in the adjusting the controller calculates a new location $(x_{proj}(t+1), y_{proj}(t+1))$ in the projection plane from which to project the beam as follows $$x_{proj}(t+1) = x_{proj}(t) - \alpha \cdot (x_{cap}^{detected}(t) - x_{cap}^{target}(t))$$

$$y_{proj}(t+1) = y_{proj}(t) - \alpha \cdot (y_{cap}^{detected}(t) - y_{cap}^{target}(t))$$

where $(x_{proj}(t), y_{proj}(t))$ is the location in the projection plane from which the beam currently is being projected, $(x_{cap}^{detected}(t), y_{cap}^{detected}(t))$ is the determined beam location, $(x_{cap}^{target}(t), y_{cap}^{target}(t))$ is the target beam location, and $\alpha$ is an adjustment factor.

8. The apparatus of claim 7, wherein the adjustment factor $\alpha(t)$ is given by $$\alpha(t) = L \cdot \frac{1}{\sqrt{(x_{proj}(t) - x_{cap}^{detected}(t))^2 + (y_{proj}(t) - y_{cap}^{detected}(t))^2}}$$

where L is a constant.

9. The apparatus of claim 1, wherein the controller performs the transmitting and the receiving in a first process loop, and the controller performs the determining and the changing in a second process loop.

10. The apparatus of claim 9, wherein the controller performs the transmitting, the receiving, the determining, and the changing as asynchronous events.

11. The apparatus of claim 1, wherein the image sensor, the projector, and the controller are contained in a handheld device body.

12. A machine-implemented method, comprising:
projecting a beam of light from a location in a projection plane onto a scene;
capturing an image of the scene in a capture plane;
transmitting the captured image to a remote destination;
receiving from the remote destination a target beam location in the capture plane;
determining a location of the beam in the capture plane; and
changing the location in the projection plane from which the beam is projected based on the determined beam location and the target beam location.

13. The method of claim 12, further comprising intermittently projecting the beam onto the scene, and wherein the determining comprises determining the location of the beam in the capture plane based on an analysis of a set of images of the scene captured by the image sensor.

14. The method of claim 13, wherein the determining comprises: spatially filtering the images in the set; identifying one or more locations in the capture plane in which differences between the spatially filtered images meet a detection threshold predicate; and ascertaining a central point in the capture plane about which the identified locations are distributed.

15. The method of claim 14, wherein the determining comprises repeating the filtering, the identifying, and the ascertaining for one or more additional sets of images of the scene captured by the image sensor; and the determining additionally comprises determining the location of the beam in the capture plane based on a temporal filtering of the ascertained central points.

16. The method of claim 12, wherein the changing comprises changing the location in the projection plane from which the beam is projected in response to a difference between the determined beam location and the target beam location.

17. The method of claim 12, wherein the changing comprises incrementally adjusting the location in the projection plane from which the beam is projected until a difference between the determined beam location and the target beam location meets an adjustment threshold predicate.

18. The method of claim 17, wherein the adjusting comprises calculating a new location $(x_{proj}(t+1), y_{proj}(t+1))$ in the projection plane from which to project the beam as follows $$x_{proj}(t+1) = x_{proj}(t) - \alpha \cdot (x_{cap}^{detected}(t) - x_{cap}^{detected}(t))$$

$$y_{proj}(t+1) = y_{proj}(t) - \alpha \cdot (y_{cap}^{detected}(t) - y_{cap}^{detected}(t))$$

where $(x_{proj}(t), y_{proj}(t))$ is the location in the projection plane from which the beam currently is being projected, $(x_{cap}^{detected}(t), y_{cap}^{detected}(t))$ is the determined beam location, $(x_{cap}^{target}(t), y_{cap}^{target}(t))$ is the target beam location, and $\alpha$ is an adjustment factor.

19. The method of claim 18, wherein the changing comprises dynamically determining a value of the adjustment factor $\alpha(t)$.

20. The method of claim 12, further comprising performing the transmitting and the receiving in a first process loop, and performing the determining and the changing in a second process loop.

21. The method of claim 20, wherein the transmitting, the receiving, the determining, and the changing are performed as asynchronous events.

22. A non-transitory computer-readable medium storing computer-readable instructions causing a computer to perform operations comprising:
projecting a beam of light from a location in a projection plane onto a scene;
capturing an image of the scene in a capture plane;
transmitting the captured image to a remote destination;
receiving from the remote destination a target beam location in the capture plane;
determining a location of the beam in the capture plane; and
changing the location in the projection plane from which the beam is projected based on the determined beam location and the target beam location.

* * * * *